US008042951B2

(12) United States Patent
Lo et al.

(10) Patent No.: US 8,042,951 B2
(45) Date of Patent: Oct. 25, 2011

(54) ILLUMINANT MODULE AND OPTICAL PROJECTION DEVICE

(75) Inventors: Wei-Cheng Lo, Hsinchu (TW); Nien-Hui Hsu, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 691 days.

(21) Appl. No.: 11/955,351

(22) Filed: Dec. 12, 2007

(65) Prior Publication Data

US 2008/0291401 A1    Nov. 27, 2008

(30) Foreign Application Priority Data

May 21, 2007  (TW) ............................... 96118069 A (51) Int. Cl.
G03B 21/16 (2006.01)
(52) U.S. Cl. ................. 353/52; 353/56; 353/57; 353/58; 353/60; 353/61; 353/119; 353/122; 349/5; 349/7; 349/8; 349/9
(58) Field of Classification Search ............. 353/56, 353/57, 61, 119, 122, 52, 58, 60; 362/345, 362/294, 373, 96; 349/5, 7, 8, 9
See application file for complete search history.

(56) References Cited

U.S. PATENT DOCUMENTS

| 3,624,380 | A | * | 11/1971 | Davis ........................... 362/149 |
| 6,290,360 | B1 | | 9/2001 | Konuma et al. |
| 6,340,237 | B1 | | 1/2002 | Koga et al. |
| 6,345,896 | B1 | * | 2/2002 | Kurosawa ..................... 353/119 |
| 6,431,710 | B2 | | 8/2002 | Fuse et al. |
| 6,575,599 | B1 | | 6/2003 | Imamura et al. |
| 6,623,123 | B2 | * | 9/2003 | Eguchi et al. .................. 353/30 |
| 7,040,763 | B2 | * | 5/2006 | Shiraishi et al. ............... 353/60 |
| 7,083,285 | B2 | * | 8/2006 | Hsu et al. ........................ 353/61 |
| 7,217,011 | B2 | * | 5/2007 | Wang et al. ................... 362/345 |
| 7,726,820 | B2 | * | 6/2010 | Hara et al. ..................... 353/119 |

(Continued)

FOREIGN PATENT DOCUMENTS

JP    09-304834    11/1997

(Continued)

OTHER PUBLICATIONS

"Office Action of Taiwan Counterpart Application" issued on Mar. 30, 2010, p. 1-p. 4.

Primary Examiner — Georgia Y Epps
Assistant Examiner — Sultan Chowdhury
(74) Attorney, Agent, or Firm — Jianq Chyun IP Office (57) ABSTRACT

An illuminant module includes a lamp including a lampwick, a reflector and a guide cap, a lamp holder, a blower, and an axial fan. At least one portion of the lampwick is disposed in the reflector. The guide cap having a guide wall, a first air outlet, and a first air inlet is connected to the reflector and covers an opening of the reflector. The lamp holder has a space where the lamp is disposed, a second air inlet corresponding to the first one, a third air inlet adjacent to the second one, a fourth air inlet adjacent to the third one, a second air outlet corresponding to the first one, and a third air outlet adjacent to the second one. The blower outside the space is disposed at the second air inlet. The axial fan outside the space is disposed adjacent to the third and fourth air inlets.

12 Claims, 7 Drawing Sheets

U.S. PATENT DOCUMENTS

| | | |
|---|---|---|
| 7,753,532 B2 * | 7/2010 | Nasu et al. .................. 353/52 |
| 7,845,803 B2 * | 12/2010 | Lv et al. ...................... 353/52 |
| 2005/0225963 A1 | 10/2005 | Huang et al. |
| 2006/0062001 A1 * | 3/2006 | Nakashita et al. .......... 362/345 |
| 2007/0070298 A1 * | 3/2007 | Hara et al. ................... 353/57 |
| 2007/0217203 A1 * | 9/2007 | Ueda ............................ 362/294 |

FOREIGN PATENT DOCUMENTS

| | | |
|---|---|---|
| JP | 11-329015 | 11/1999 |
| JP | 2005-345569 | 12/2005 |
| JP | 2006-350237 | 12/2006 |
| JP | 2007-101897 | 4/2007 |
| TW | 523121 | 3/2003 |
| TW | 524319 | 3/2003 |
| TW | I235281 | 7/2005 |
| TW | M278919 | 10/2005 |
| TW | 200639566 | 11/2006 |
| TW | 200702880 | 1/2007 |
| TW | 200734793 | 9/2007 |

* cited by examiner

ILLUMINANT MODULE AND OPTICAL PROJECTION DEVICE

CROSS-REFERENCE TO RELATED APPLICATION

This application claims the priority benefit of Taiwan application serial no. 96118069, filed on May 21, 2007. The entirety of the above-mentioned patent application is hereby incorporated by reference herein and made a part of this specification.

BACKGROUND OF THE INVENTION

1. Field of the Invention

The present invention relates to an illuminant module, and more particularly to an illuminant module applied to an optical projection device and an optical projection device having the illuminant module.

2. Description of Related Art

A conventional optical projection device includes an illuminant module, a light valve, and a projection lens. A reflector of the illuminant module can make light emitted by a lampwick inside the reflector form an illuminating light beam. The light valve is disposed on a transmission path of the illuminating light beam, and is capable of converting the illuminating light beam into an image light beam. The projection lens is disposed on a transmission path of the image light beam, and capable of projecting the image light beam on a screen outside the optical projection device.

The lampwick of the illuminant module generates exhaust heat to increase the temperature inside the reflector and that outside the reflector when the lampwick emits light. In order to make the illuminant module operate normally, a blower and an axial fan of the illuminant module respectively generate a first air current and a second air current such that the exhaust heat inside and outside the reflector is transferred to the outside of the illuminant module through a first air outlet and a second air outlet of the illuminant module.

Due to the high temperature inside the reflector, the temperature of the first air current flowing through the inside of the reflector and departing from the first air outlet is high. However, when the first air current and the second air current respectively flow out of the illuminant module through the first air outlet and the second air outlet, the first air current with a high temperature and the second air current with a low temperature do not effectively interflow such that the temperature of the first air outlet of the illuminant module and that of the area adjacent to the first air outlet are excessively high, respectively.

SUMMARY OF THE INVENTION

The present invention provides an illuminant module, and each air outlet thereof has a low temperature when the illuminant module operates.

The present invention provides an optical projection device, and each air outlet of the illuminant module of the optical projection device has a low temperature when the illuminant module operates.

An illuminant module including a lamp, a lamp holder, a blower, and an axial fan is provided in an embodiment of the present invention. The lamp includes a lampwick, a reflector, and a guide cap. At least one portion of the lampwick is disposed in the reflector, and the reflector is capable of making the light emitted by the lampwick form an illuminating light beam. The reflector has a first opening to allow the illuminating light beam to pass through. The guide cap having a guide wall, a first air outlet, and a first air inlet is connected to the reflector and covers the first opening of the reflector.

The lamp holder has a space in which the lamp is disposed, a second air inlet corresponding to the first air inlet, a third air inlet adjacent to the second air inlet, a fourth air inlet adjacent to the third air inlet, a second air outlet corresponding to the first air outlet, and a third air outlet adjacent to the second air outlet.

The blower outside the space is disposed at the second air inlet. The blower is capable of providing a first air current. The first air current flows into the reflector through the second air inlet and the first air inlet and flows out of the reflector through the first air outlet and the second air outlet.

The axial fan outside the space is disposed adjacent to the third air inlet and the fourth air inlet. The axial fan is capable of providing a second air current flowing into the space through the fourth air inlet and providing a third air current flowing into the space through the third air inlet. The second air current flows through a periphery of the reflector and flows out of the space through the third air outlet. The third air current flows along the guide wall, and flows out of the space through the second air outlet.

The optical projection device including an illuminant module, a light valve, and a projection lens is provided in another embodiment of the present invention. The illuminant module includes a lamp, a lamp holder, a blower, and an axial fan. The lamp includes a lampwick, a reflector, and a guide cap. At least one portion of the lampwick is disposed in the reflector, and the reflector is capable of making the light emitted by the lampwick form an illuminating light beam. The reflector has a first opening to allow the illuminating light beam to pass through. The guide cap having a guide wall, a first air outlet, and a first air inlet is connected to the reflector and covers the first opening of the reflector.

The lamp holder has a space in which the lamp is disposed, a second air inlet corresponding to the first air inlet, a third air inlet adjacent to the second air inlet, a fourth air inlet adjacent to the third air inlet, a second air outlet corresponding to the first air outlet, and a third air outlet adjacent to the second air outlet.

The blower outside the space is disposed at the second air inlet. The blower is capable of providing a first air current. The first air current flows into the reflector through the second air inlet and the first air inlet and flows out of the reflector through the first air outlet and the second air outlet.

The axial fan outside the space is disposed adjacent to the third air inlet and the fourth air inlet. The axial fan is capable of providing a second air current flowing into the space through the fourth air inlet and providing a third air current flowing into the space through the third air inlet. The second air current flows through a periphery of the reflector and flows out of the space through the third air outlet. The third air current flows along the guide wall and flows out of the space through the second air outlet.

The light valve is disposed on a transmission path of the illuminating light beam, and the light valve is capable of converting the illuminating light beam into an image light beam. The projection lens is disposed on a transmission path of the image light beam, and capable of projecting the image light beam on a screen.

The first air current flowing through the inside of the reflector and having a high temperature firstly interflows with the third air current flowing through the guide wall and having a low temperature. Then, the first air current and the third air current further interflow with the second air current flowing through the periphery of the reflector and having a much lower temperature. Therefore, as compared with the conventional art, the first air current, the second air current, and the third air current flowing out of the illuminant module may effectively interflow such that the temperature of each air outlet of the illuminant module is further reduced.

In addition, since the blower and the axial fan may generate air currents in different flow directions through a plurality of air inlets of the lamp holder, the air currents in the different flow directions may effectively disperse the exhaust heat generated by the operative lamp to the outside. Therefore, the temperature of each component of the lamp of the illuminant module and the temperature of the lamp holder of the illuminant module may be effectively reduced, respectively.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
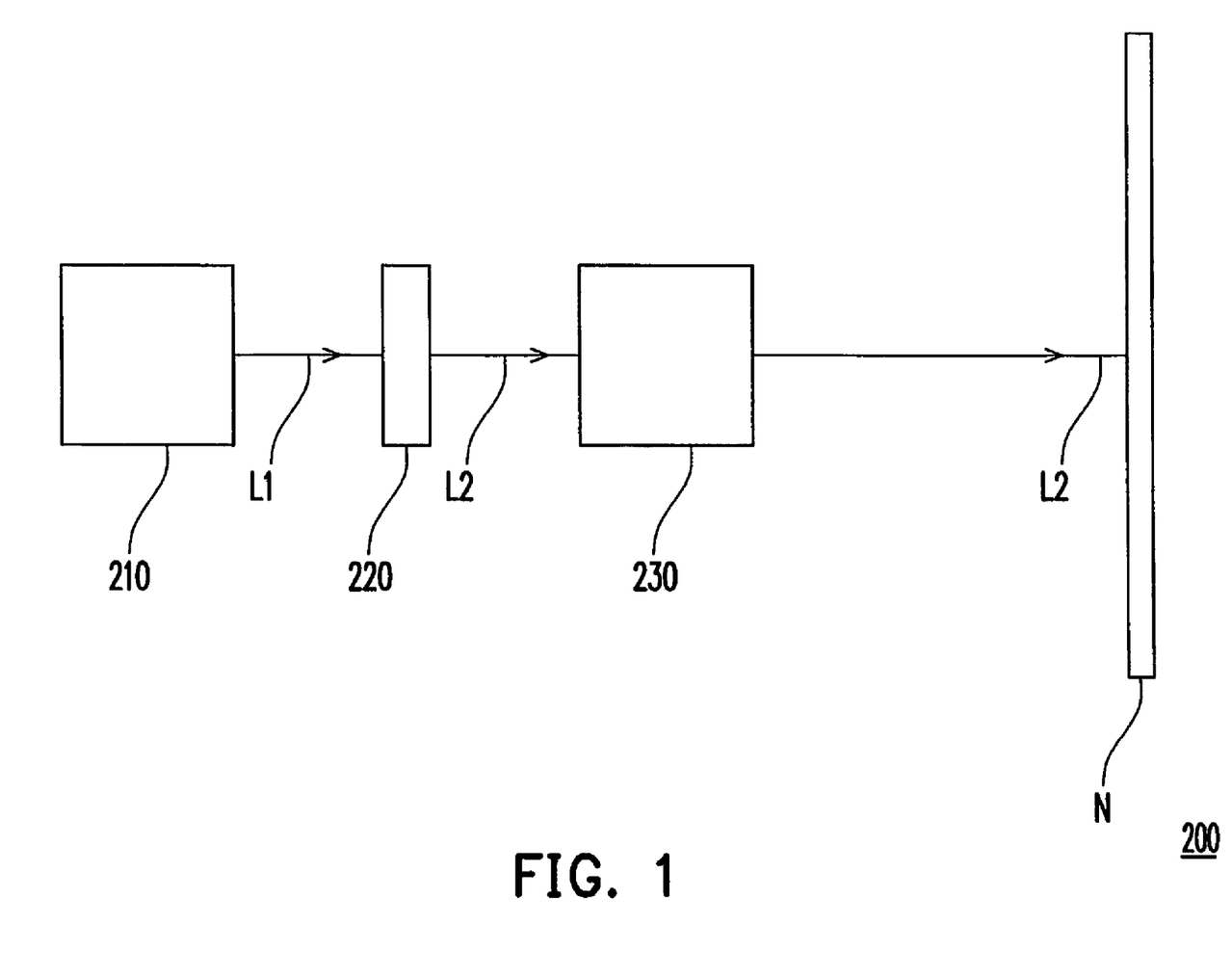
FIG. 1 is a schematic view of an optical projection device according to an embodiment of the present invention.

Referring to FIG. 1, a schematic view of an optical projection device according to an embodiment of the present invention is shown. The optical projection device 200 in this embodiment includes an illuminant module 210, a light valve 220, and a projection lens 230. The illuminant module 210 is capable of emitting an illuminating light beam L1. The light valve 220 is disposed on a transmission path of the illuminating light beam L1, and the light valve 220 is capable of converting the illuminating light beam L1 into an image light beam L2. The projection lens 230 is disposed on a transmission path of the image light beam L2, and the projection lens 230 is capable of projecting the image light beam L2 on a screen N.

Figure 2:
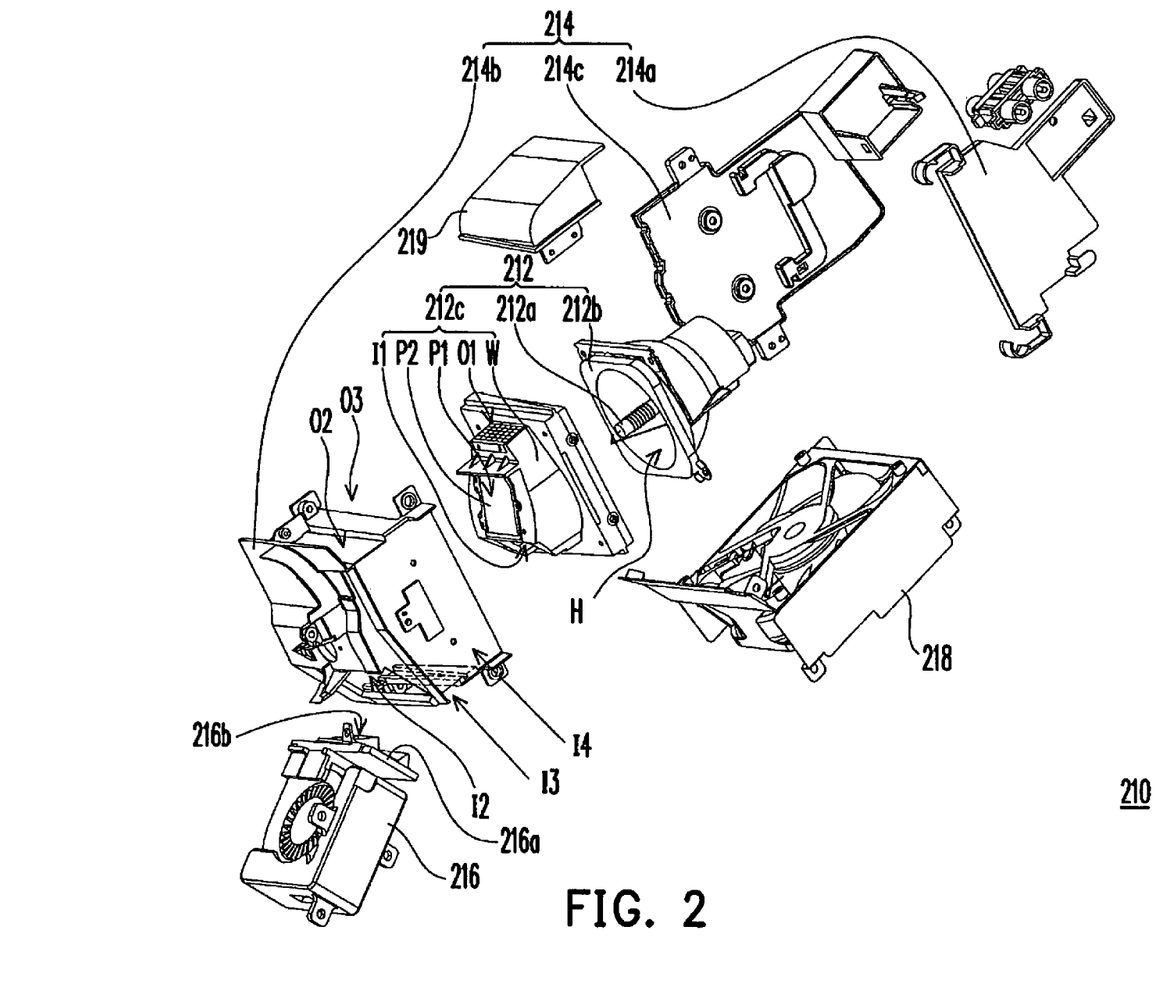
FIG. 2 is a schematic exploded perspective view of an illuminant module of the optical projection device in FIG. 1.
Figure 3:
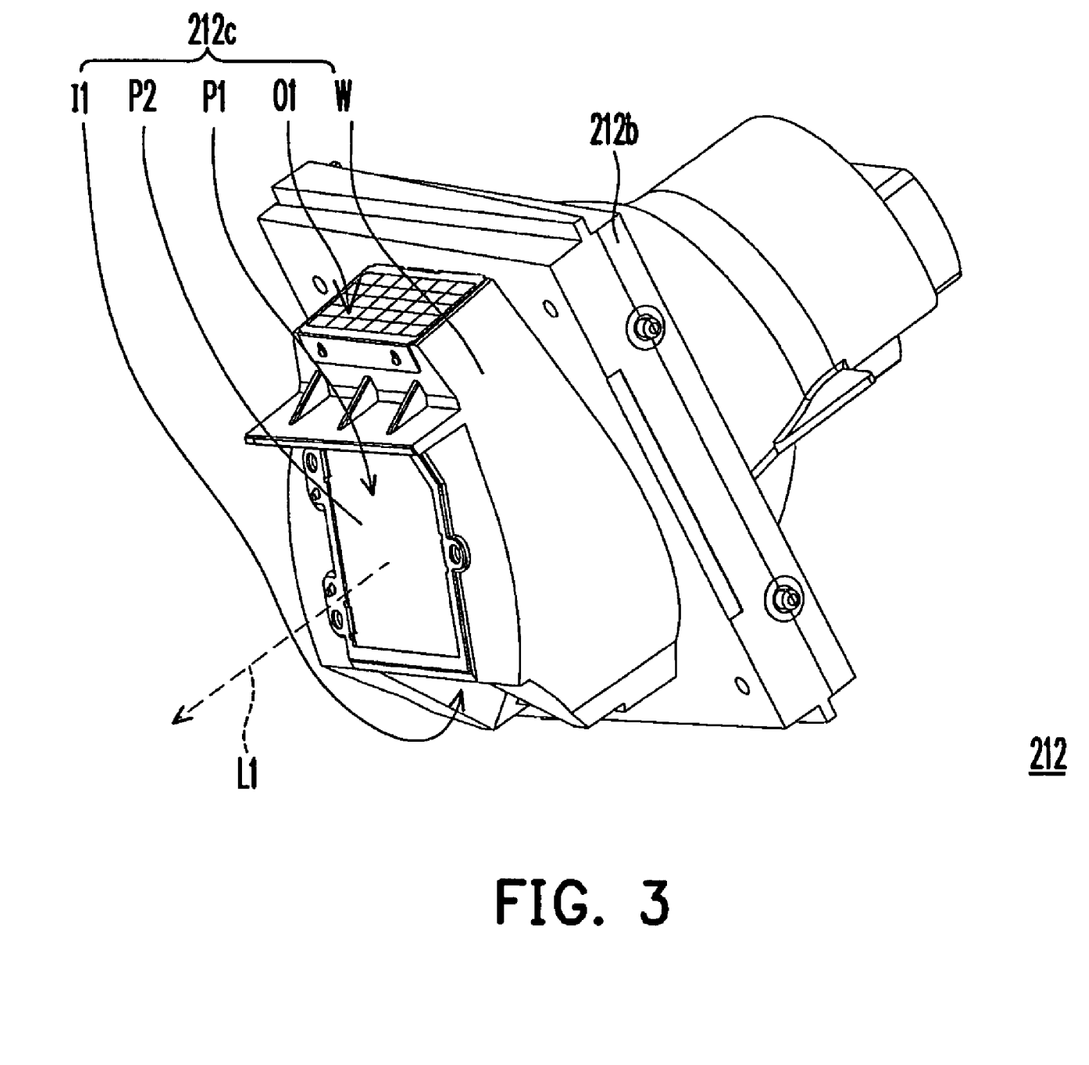
FIG. 3 is a schematic perspective assembly view of a lamp of the illuminant module in FIG. 2.

FIG. 2 is a schematic exploded perspective view of an illuminant module of the optical projection device in FIG. 1. FIG. 3 is a schematic perspective assembly view of a lamp of the illuminant module in FIG. 2. Referring to FIGS. 2 and 3, the illuminant module 210 includes a lamp 212, a lamp holder 214, a blower 216, and an axial fan 218. The lamp 212 includes a lampwick 212a (see FIG. 2), a reflector 212b, and a guide cap 212c. At least one portion of the lampwick 212a is disposed in the reflector 212b, and the reflector 212b is capable of making the light emitted by the lampwick 212a form an illuminating light beam L1. The reflector has an opening H, so as to allow the illuminating light beam L1 to pass through. The guide cap 212c is connected to the reflector 212b and covers the opening H of the reflector 212b, and the guide cap 212c has a guide wall W, a first air outlet O1, and a first air inlet I1. In this embodiment, the guide cap 212c may be connected to the reflector 212b by means of screws (not shown) locking. The saying that the guide cap 212c covers the opening H of the reflector 212b or similar sayings in the present invention mean that the guide cap 212c is disposed at the outer side of the opening H of the reflector 212b and covers part of the end surface of the opening H of the reflector 212b, as shown in FIG. 3, rather than completely covers the opening H of the reflector 212b.

In this embodiment, the guide cap 212c may further have an opening P1 and a transparent element P2. The opening P1 is disposed on a transmission path of the illuminating light beam L1, and the transparent element P2 may be a filter disposed at the opening P1. Therefore, after the illuminating light beam L1 passes through the transparent element P2 such as a filter, light with certain frequencies of the illuminating light beam L1, such as infrared light or UV light, will be filtered out.

Figure 4:
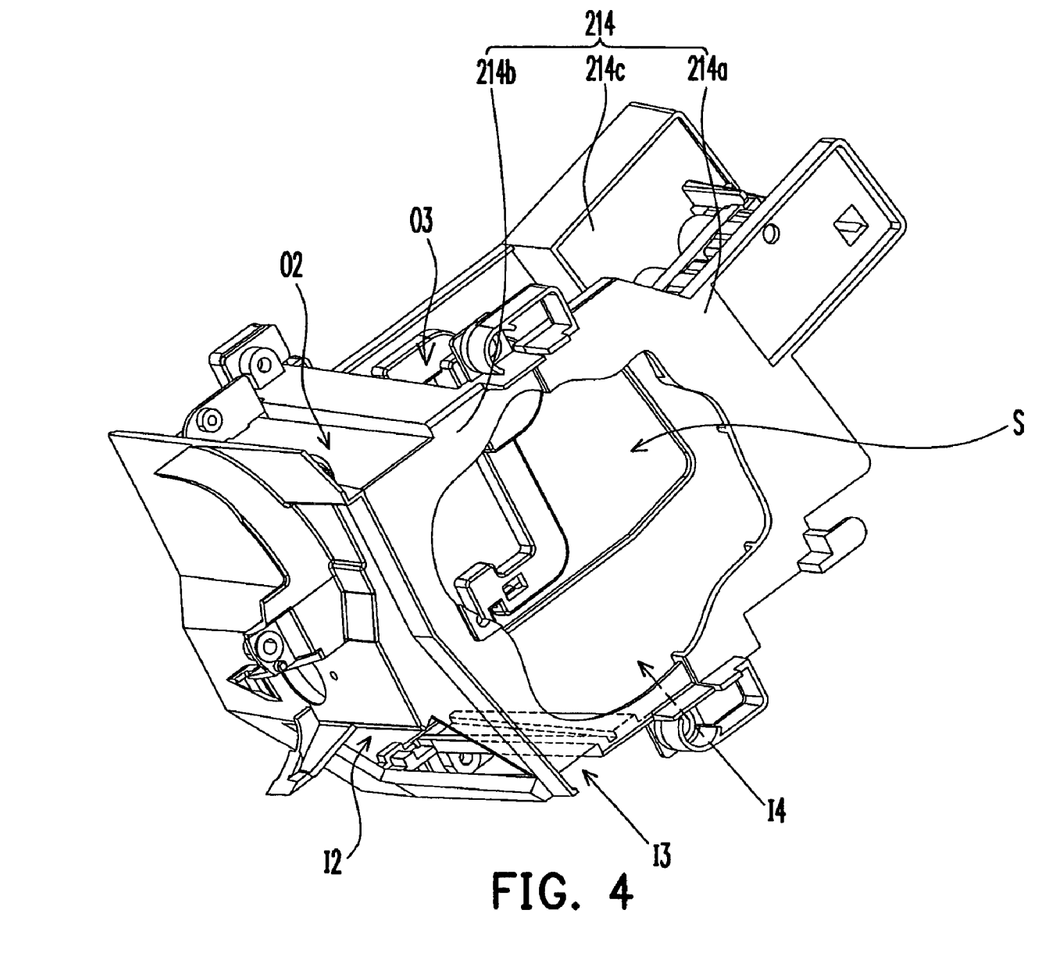
FIG. 4 is a schematic perspective assembly view of a lamp holder of the illuminant module in FIG. 2.
Figure 5:
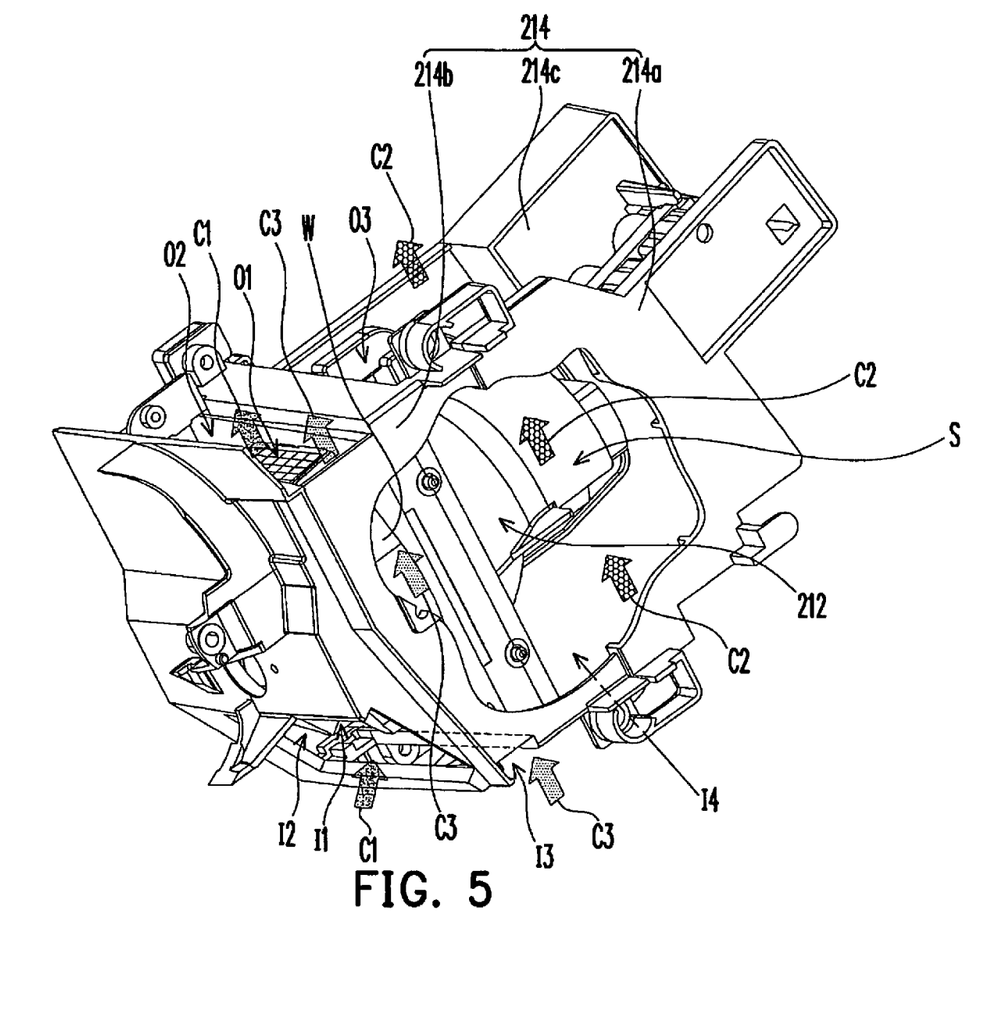
FIG. 5 is a schematic perspective assembly view of the lamp disposed in the lamp holder according to the illuminant module in FIG. 2.

FIG. 4 is a schematic perspective assembly view of a lamp holder of the illuminant module in FIG. 2, and FIG. 5 is a schematic perspective assembly view of the lamp disposed in the lamp holder according to the illuminant module in FIG. 2. For the convenience of illustration, some parts of the lamp holder 214 are omitted in FIG. 5. Referring to FIGS. 2, 4, and 5, the lamp holder 214 has a space S, a second air inlet I2 corresponding to the first air inlet I1, a third air inlet I3 adjacent to the second air inlet I2, a fourth air inlet I4 adjacent to the third air inlet I3, a second air outlet O2 corresponding to the first air outlet O1, and a third air outlet O3 adjacent to the second air outlet O2.

In this embodiment, the lamp holder 214 includes a first holder portion 214a, a second holder portion 214b, and a third holder portion 214c. The second air inlet I2, the third air inlet I3, the fourth air inlet I4, the second air outlet O2, and the third air outlet O3 may be disposed on the second holder portion 214b. The first holder portion 214a, the second holder portion 214b, and the third holder portion 214c are assembled to form the space S in which the lamp 212 is disposed. In specific, the process of assembling the lamp 212 of this embodiment in the lamp holder 214 is illustrated as follows. The lamp 212 may be firstly fixed on the third holder portion 214c. Next, the first holder portion 214a and the second holder portion 214b may be assembled by means of screws (not shown) locking. Finally, the lamp 212, the third holder portion 214c, the first holder portion 214a and the second holder portion 214b are assembled together.

In this embodiment, after the lamp 212 and the lamp holder 214 are assembled, a part of the first holder portion 214a may be disposed above the lamp 212, and a part of the third holder portion 214c may be disposed under the lamp 212. One end of the first holder portion 214a away from the guide cap 212c and one end of the third holder portion 214c away from the guide cap 212c are assembled and bonded. A part of the second holder portion 214b may be disposed in front of the lamp 212 and at both sides of the lamp 212, and a part of the second holder portion 214b may be disposed above the lamp 212. It should be noted that the lamp holder 214 may have different appearances and may be assembled in different manners according to designers' requirements. Herein, the lamp holder 214 in this embodiment is merely an example and is not intended to limit the present invention.

Figure 6:
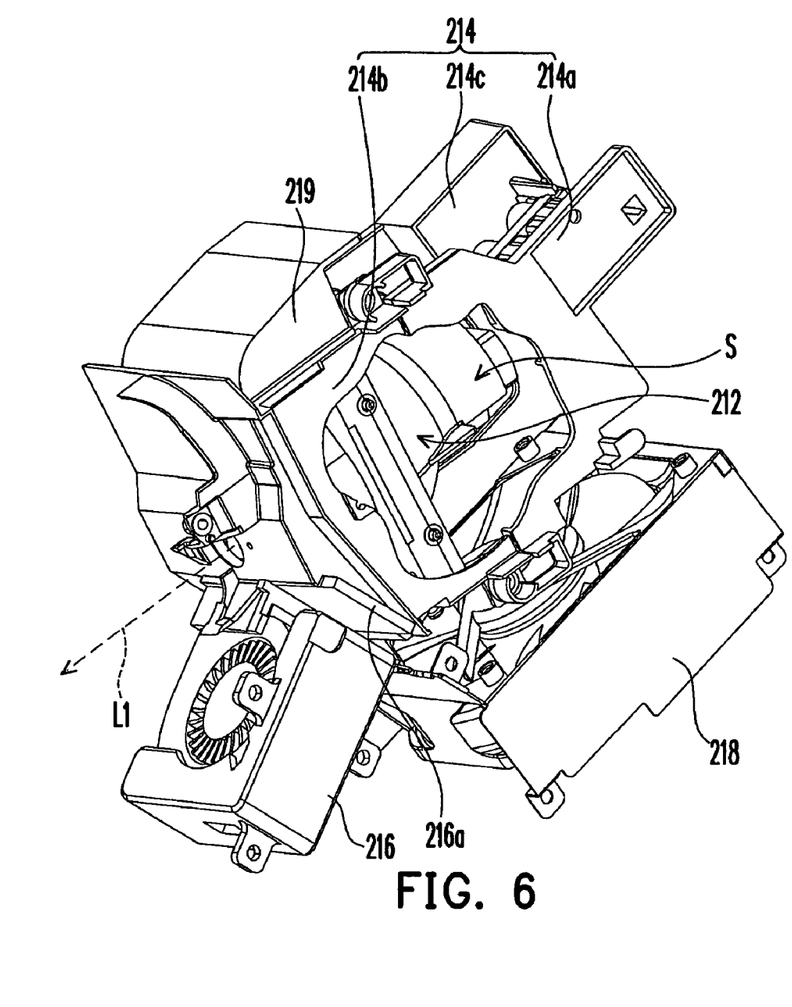
FIG. 6 is a schematic perspective assembly view of the illuminant module in FIG. 2.

FIG. 6 is a schematic perspective assembly view of the illuminant module in FIG. 2. For the convenience of illustration, some parts of the lamp holder 214 are omitted in FIG. 6. Referring to FIGS. 2, 5, and 6, the blower 216 is disposed at the second air inlet I2 and outside the space S. In specific, the blower 216 may be disposed at the second air inlet I2 by means of a guide element 216a such as blower duct, and a part of the blower duct 216a penetrates through the second air inlet I2. The blower duct 216a may have a guide hole 216b and the guide hole 216b may be in close connect with the first air inlet I1. In addition, the axial fan 218 outside the space S is disposed adjacent to the third air inlet I3 and the fourth air inlet I4. In this embodiment, the illuminant module 210 may further include a guide element 219. The guide element 219 is disposed at the second air outlet O2 and outside the space S. In other embodiments, the axial fan 218 outside the space S may be disposed next to the third air inlet I3 and the fourth air inlet I4.

Figure 7:
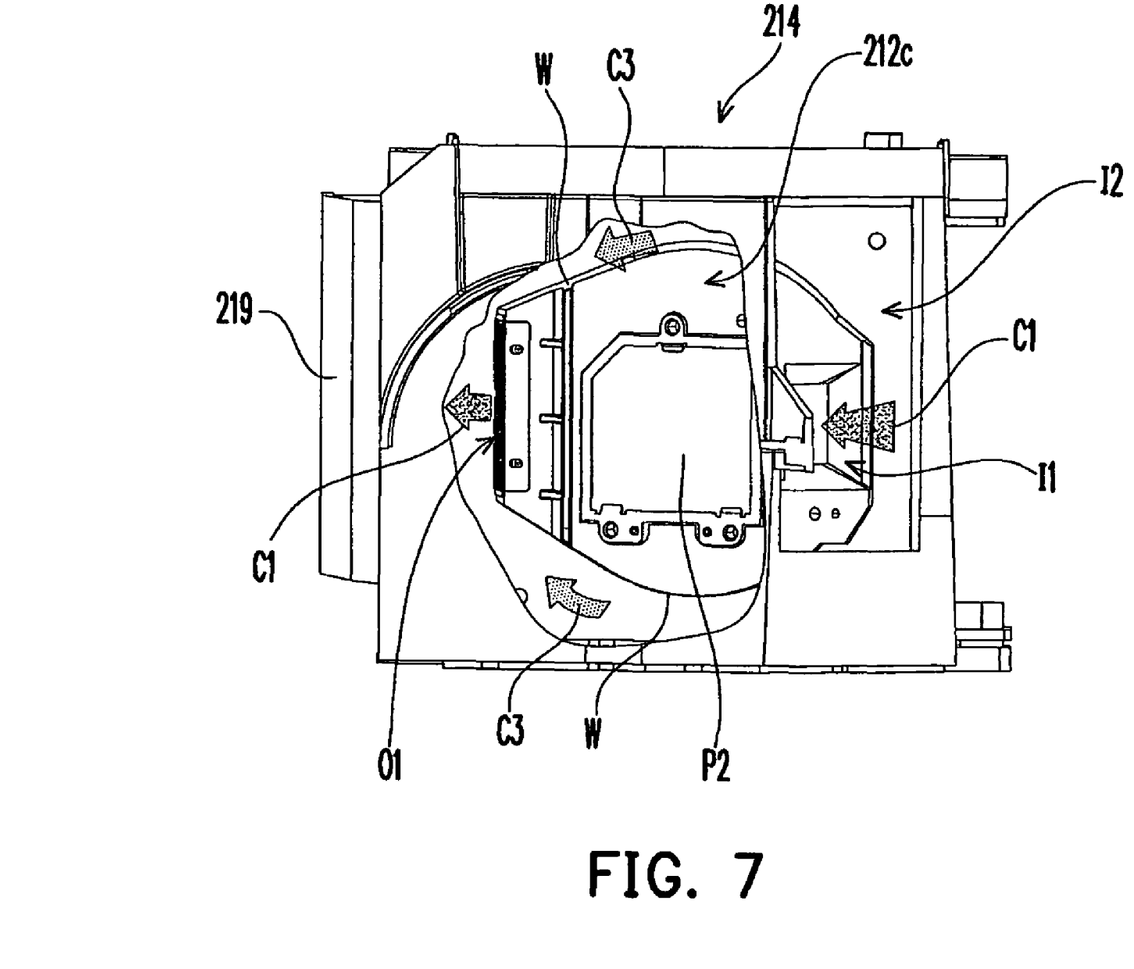
FIG. 7 is a schematic front view of the illuminant module in FIG. 6.

FIG. 7 is a schematic front view of the illuminant module in FIG. 6. For the convenience of illustration, some parts of the lamp holder 214, the blower 216, and the axial fan 218 are omitted in FIG. 7. Referring to FIGS. 2, 5, and 7, the blower 216 is capable of providing a first air current C1. The first air current C1 flows into the reflector 212b (see FIG. 2) through the second air inlet I2 and the first air inlet I1, and flows out of the reflector 212b through the first air outlet O1 and the second air outlet O2. In specific, in this embodiment, the first air current C1 may flow into the reflector 212b through the blower duct 216a. Since the guide hole 216b may be in close connect with the first air inlet I1, the first air current C1 will not leak through the junction between the guide hole 216b and the first air inlet I1.

The axial fan 218 is capable of providing a second air current C2 flowing into the space S through the fourth air inlet I4 and providing a third air current C3 flowing into the space S through the third air inlet I3. The second air current C2 flows through a periphery of the reflector 212b (see FIG. 2) and flows out of the space S through the third air outlet O3. The third air current C3 flows along the guide wall W of the guide cap 212c, and flows out of the space S through the second air outlet O2. In this embodiment, according to the relative positions shown in FIG. 7, the third air current C3 is divided and respectively pass through the upper side and lower side of the guide cap 212c when the third air current C3 flows along the guide wall W.

The temperature of the first air current C1 flowing through the inside of the reflector 212b is usually higher than the temperature of the third air current C3 flowing through the guide wall W of the guide cap 212c. The temperature of the third air current C3 flowing through the guide wall W of the guide cap 212c is usually higher than the temperature of the second air current C2 flowing through the periphery of the reflector 212b. Since the first air current C1 flowing through the inside of the reflector 212b and having a high temperature firstly interflows at the second air outlet O2 with the third air current C3 flowing through the guide wall W and having a low temperature, the temperature of the first air current C1 is lowered effectively. Moreover, since the first air current C1 and the third air current C3 interflow with the second air current C2 flowing through the periphery of the reflector 212b and having a much lower temperature after the first air current C1 and the third air current C3 flow through the guide element 219, the temperature of the first air current C1 and that of the third air current C3 may also be reduced effectively.

It should be indicated here that the guide element 219 in this embodiment has the function of making the first air current C1, the third air current C3, and the second air current C2 interflow effectively. However, the guide element 219 may be omitted by designers according to design requirements (for example, in consideration of the accommodating space), so that the second air outlet O2 may be designed to face the flowing direction of the second air current C2 flowing out of the illuminant module 210 through the third air outlet O3. However, the above description is not shown in the drawings.

In view of the above, the illuminant module in the embodiment of the present invention and the optical projection device using the illuminant module at least has one, a part, or all of the following advantages.

1. The first air current flowing through the inside of the reflector and having a high temperature may firstly interflow with the third air current flowing through the guide wall and having a low temperature, and then the first air current and the third air current interflow with the second air current flowing through the periphery of the reflector and having a much lower temperature. Therefore, as compared with the conventional art, the first air current, the second air current, and the third air current flowing out of the illuminant module may effectively interflow such that the temperature of each air outlet of the illuminant module is further reduced.

2. Since the blower and the axial fan may generate a plurality of air currents in different directions through a plurality of air inlets of the lamp holder, the air currents in different directions may effectively transfer the exhaust heat generated by the operative lamp to the outside. Therefore, the temperature of each component of the lamp of the illuminant module and the temperature of the lamp holder may be effectively reduced, respectively.

3. Since the third air current is divided and respectively pass through the upper side and the lower side of the guide cap, the exhaust heat generated by the heated guide cap may be dispersed effectively by the third air current, and the third air current may be a heat insulation medium between the guide cap and the lamp holder such that the temperatures of the lamp holder portions on the upper and lower sides of the lamp holder are reduced.

4. Since the third air current flows toward the second air outlet, the first air current flowing into the reflector and flowing out of the reflector through the first air outlet may flow along the flowing direction of the third air current to flow out of the illuminant module through the second air outlet. Therefore, the first air current does not easily flow adversely.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illuminant module, comprising:
   a lamp, comprising:
      a lampwick;
      a reflector, wherein at least one portion of the lampwick is disposed in the reflector, the reflector is capable of making light emitted by the lampwick form an illuminating light beam, and the reflector has a first opening to allow the illuminating light beam to pass through; and
      a guide cap, connected to the reflector and covering the first opening of the reflector, wherein the guide cap has a guide wall, a first air outlet, and a first air inlet;
   a lamp holder, having a space, a second air inlet corresponding to the first air inlet, a third air inlet adjacent to the second air inlet, a fourth air inlet adjacent to the third air inlet, a second air outlet corresponding to the first air outlet, and a third air outlet adjacent to the second air outlet, wherein the lamp is disposed in the space, the first air inlet and the first air outlet are openings on the guide cap, and the second air inlet, the third air inlet, the fourth air inlet, the second air outlet and the third air outlet are formed on the boundary of the space;
   a blower, disposed at the second air inlet and outside the space, wherein the blower is capable of providing a first air current, and the first air current flows into the reflector through the second air inlet and the first air inlet and flows out of the reflector through the first air outlet and the second air outlet; and
   an axial fan, disposed adjacent to the third air inlet and the fourth air inlet and outside the space, wherein the axial fan is capable of providing a second air current flowing into the space through the fourth air inlet and providing a third air current flowing into the space through the third air inlet, the second air current flows through a periphery of the reflector and flows out of the space through the third air outlet, and the third air current flows along the guide wall and flows out of the space through the second air outlet.

2. The illuminant module as claimed in claim 1, further comprising a first guide element disposed at the second air outlet and outside the space, wherein the first air current and the third air current flow through the first guide element to interflow with the second air current.

3. The illuminant module as claimed in claim 1, wherein the guide cap further has a second opening and a transparent element, wherein the second opening is disposed on a transmission path of the illuminating light beam, and the transparent element is disposed at the second opening.

4. The illuminant module as claimed in claim 3, wherein the transparent element is an optical filter.

5. The illuminant module as claimed in claim 1, further comprising a second guide element disposed at the second air inlet, wherein a portion of the second guide element penetrates through the second air inlet, and the second guide element has a guide hole connected with the first air inlet.

6. The illuminant module as claimed in claim 1, wherein the axial fan is disposed next to the third air inlet and the fourth air inlet and outside the space.

7. An optical projection device, comprising:
   an illuminant module, comprising:
      a lamp, comprising:
         a lampwick;
         a reflector, wherein at least one portion of the lampwick is disposed in the reflector, the reflector is capable of making light emitted by the lampwick form an illuminating light beam, and the reflector has a first opening to allow the illuminating light beam to pass through; and
         a guide cap, connected to the reflector and covering the first opening of the reflector, wherein the guide cap has a guide wall, a first air outlet, and a first air inlet;

a lamp holder, having a space, a second air inlet corresponding to the first air inlet, a third air inlet adjacent to the second air inlet, a fourth air inlet adjacent to the third air inlet, a second air outlet corresponding to the first air outlet, and a third air outlet adjacent to the second air outlet, wherein the lamp is disposed in the space, the first air inlet and the first air outlet are openings on the guide cap, and the second air inlet, the third air inlet, the fourth air inlet, the second air outlet and the third air outlet are formed on the boundary of the space;

a blower, disposed at the second air inlet and outside the space, wherein the blower is capable of providing a first air current, and the first air current flows into the reflector through the second air inlet and the first air inlet and flows out of the reflector through the first air outlet and the second air outlet; and an axial fan, disposed adjacent to the third air inlet and the fourth air inlet and outside the space, wherein the axial fan is capable of providing a second air current flowing into the space through the fourth air inlet and providing a third air current flowing into the space through the third air inlet, the second air current flows through a periphery of the reflector and flows out of the space through the third air outlet, and the third air current flows along the guide wall and flows out of the space through the second air outlet;

a light valve, disposed on a transmission path of the illuminating light beam, wherein the light valve is capable of converting the illuminating light beam into an image light beam; and a projection lens, disposed on an transmission path of the image light beam, wherein the projection device is capable of projecting the image light beam on a screen.

8. The optical projection device as claimed in claim 7, wherein the illuminant module further comprises a first guide element disposed at the second air outlet and outside the space, wherein the first air current and the third air current flow through the first guide element to interflow with the second air current.

9. The optical projection device as claimed in claim 7, wherein the guide cap further has a second opening and a transparent element, wherein the second opening is disposed on a transmission path of the illuminating light beam, and the transparent element is disposed at the second opening.

10. The optical projection device as claimed in claim 9, wherein the transparent element is an optical filter.

11. The optical projection device as claimed in claim 7, further comprising a second guide element disposed at the second air inlet, wherein a portion of the second guide element penetrates through the second air inlet, and the second guide element has a guide hole connected with the first air inlet.

12. The optical projection device as claimed in claim 7, wherein the axial fan is disposed next to the third air inlet and the fourth air inlet and outside the space.

* * * * *